US012612509B2

(12) United States Patent
Gao

(10) Patent No.: US 12,612,509 B2
(45) Date of Patent: Apr. 28, 2026

(54) BIOCOMPATIBLE MEMBRANE, PREPARATION METHOD THEREFOR, AND IMPLANTABLE BIOSENSOR

(71) Applicant: Sinocare Inc., Changsha (CN)

(72) Inventor: Zhiqiang Gao, Changsha (CN)

(73) Assignee: Sinocare Inc., Changsha (CN)

( * ) Notice: Subject to any disclaimer, the term of this patent is extended or adjusted under 35 U.S.C. 154(b) by 903 days.

(21) Appl. No.: 17/910,122

(22) PCT Filed: Apr. 16, 2020

(86) PCT No.: PCT/CN2020/085033
§ 371 (c)(1),
(2) Date: Sep. 8, 2022

(87) PCT Pub. No.: WO2021/207994
PCT Pub. Date: Oct. 21, 2021

(65) Prior Publication Data
US 2023/0323079 A1 Oct. 12, 2023

(51) Int. Cl.
| | |
|---|---|
| *C08K 5/00* | (2006.01) |
| *C08K 5/17* | (2006.01) |
| *C08L 25/08* | (2006.01) |
| *C08L 39/08* | (2006.01) |

(52) U.S. Cl.
CPC .............. *C08K 5/0025* (2013.01); *C08K 5/17* (2013.01); *C08L 25/08* (2013.01); *C08L 39/08* (2013.01)

(58) Field of Classification Search
CPC .......... C08K 5/0025; C08K 5/17; C08K 5/18; C08L 25/08; C08L 39/08; C08L 33/26; C08L 39/04; C08L 83/06; C08L 71/02; C08L 83/08; C08G 77/14; C09D 183/06; C12Q 1/006; C08J 5/2243
See application file for complete search history.

(56) References Cited

U.S. PATENT DOCUMENTS

2011/0021896 A1* 1/2011 Mao ...................... A61B 5/6846
600/347
2017/0347933 A1* 12/2017 Wang ................. C08G 18/7671

* cited by examiner

*Primary Examiner* — Alicia Bland

(57) ABSTRACT

A biocompatible membrane including a crosslinking agent, a hydrophilic material, a hydrophobic material, and a solvent; the biocompatible membrane can implement simultaneous regulation of oxygen and glucose, thereby improving the stability and service life of a biocompatible membrane solution, a preparation method for the biocompatible membrane and an implantable biosensor.

7 Claims, 6 Drawing Sheets

BIOCOMPATIBLE MEMBRANE, PREPARATION METHOD THEREFOR, AND IMPLANTABLE BIOSENSOR

TECHNICAL FIELD

This invention generally relates to the technical field of biosensors, and more particularly, to a biocompatible membrane, a preparation method for the biocompatible membrane and an implantable biosensor.

BACKGROUND

The rapid development of an implantable human body continuous monitoring system (e.g., an implantable glucose continuous monitoring system) has benefited millions of diabetes patients. Diabetes is now a worldwide disease. According to the statistics of the International Diabetes Federation, there are more than 400 million diabetes patients in the world, among which more than 100 million patients are Chinese. Instead of a radical cure of diabetes, the existing medical technology merely controls the blood glucose to within a normal range, thereby effectively preventing and reducing the complications. Under such treatment, daily blood glucose self-monitoring has become a necessity for diabetes patients.

However, the conventional finger blood glucose detection has many shortcomings. For example, it merely provides the blood glucose value at a specific time point in a day. To have reliable blood glucose monitoring, diabetes patients need to frequently perform finger blood glucose detection daily, resulting in great inconvenience. Implantable glucose continuous monitoring systems allow diabetes patients to conveniently and effectively regulate and control the blood glucose. Being capable of continuously detecting blood glucose in real time, they have gradually become a powerful tool for regulating blood glucose.

As a major component of a biosensor of an implantable continuous glucose monitoring system and the only interface that directly contacts with a living body, the performance of a biocompatible membrane directly determines the biocompatibility, sensitivity, stability and anti-interference ability of an implantable continuous glucose monitoring system, as well as its service life. Conventional implantable continuous monitoring systems (e.g., an implantable glucose continuous monitoring system) are developed based on first or second-generation biosensing technology. For example, Dexcom's G5 and G6, as well as Medtronic's Guardian and iPro2 adopt the first-generation biosensing technology to continuously monitor glucose, whose operating principle is to indirectly monitor glucose by detecting hydrogen peroxide generated when oxygen is reduced during the catalytic oxidation of glucose oxidase by using electrochemical methods. To catalyze the oxidation of glucose to realize a monitoring of glucose, the continuous glucose monitoring system developed based on the first-generation biosensing technology relies on natural mediators of oxygen—glucose oxidase in body fluid such as tissue fluid or blood, while the oxygen content in body fluid (0.2-0.3 mmol/L) is far lower than that of glucose (5-10 mmol/L). Therefore, based on high biocompatibility, its biocompatible membrane must allow oxygen to pass through at maximum extent while effectively simulating the passing through of glucose. Generally, compared with glucose, oxygen is hydrophobic, and its biocompatible membrane must therefore be highly hydrophobic. However, the demand of high hydrophobicity has brought great challenges to the design of biocompatible membranes.

Despite more than 20 years of research and development, it still fails to meet the needs of a continuous glucose monitoring. For example, Medtronic's Guardian and iPro2 must be calibrated twice a day, and their service life merely lasts one week.

At the end of the last century, Heller et al. (Accounts of Chemical Research 23 (1990) 128-134) found that the introduction of redox substances—artificial redox mediators (small redox molecules such as ferricyanide, ferrocene and its derivatives or redox polymers) into biosensor membranes allows glucose oxidase to exchange electrons with the electrode through these artificial mediators. The second-generation biosensing technology developed based on this principle is extensively used in biosensors, especially glucose biosensors, including glucose biosensors of an implantable continuous glucose monitoring system, such as Free-Style Libre of Abbott Diabetes Care. Because the second-generation biosensing technology can achieve direct electrochemical detection of glucose by means of introducing the synthetic redox mediator into the biosensor, through the molecular design and optimization of the redox mediator, the detection of glucose is done at a very low electric potential, thus greatly improving the anti-interference ability of the implantable continuous glucose monitoring system. The sensitivity of this glucose monitoring system has also been significantly improved because it directly detects glucose using an artificial redox mediator. Moreover, although a direct electrochemical detection of glucose is realized through the introduction of synthetic redox mediator, as a natural mediator of glucose oxidase, oxygen inevitably participates in the catalytic oxidation of glucose and becomes a major interference factor during the glucose monitoring.

To further improve the performance of this implantable continuous glucose monitoring system, various biocompatible membranes are introduced to eliminate the interference of oxygen at maximum extent while widening the monitoring range of glucose. Despite the difference in hydrophilicity between glucose and oxygen, high hydrophilicity is a basic characteristic of this type of biocompatible membranes. Although they are capable of effectively eliminating interference of oxygen, it is difficult to simultaneously achieve an accurate regulation of oxygen and glucose. To effectively regulate and control glucose, the thickness of a biocompatible membrane must be significantly increased. A biocompatible membrane with excessive thickness could directly prolong the response time to glucose of the implantable continuous glucose monitoring system, which may severely reduce its accuracy. For example, FreeStyle Libre made by Abbott Diabetes Care has a response time to glucose of 8-10 minutes in a PBS (pH 7.4) buffer solution. Additionally, a chemical cross-linking reaction exists in the formula of the conventional biocompatible membranes, which greatly shortens the service life of the biocompatible membrane solution while increasing the manufacturing cost of the implantable continuous glucose monitoring system. Even worse, along with the increase of operating time, more and more chemical cross-linking reactions occur, and the viscosity of the biocompatible membrane solution increases as well, resulting in poor consistency of finished products.

SUMMARY

The purpose of the present invention is to provide a biocompatible membrane, a preparation method for the biocompatible membrane and an implantable biosensor. The biocompatible membrane of the present invention is capable of improving the biocompatibility of a biosensor, simultaneously realizing the regulation of oxygen and glucose, and improving the stability and service life of the biocompatible membrane solution.

To achieve the above purpose, the present invention adopts the following technical solution:

The present invention provides a biocompatible membrane, mainly made of the following components: a crosslinking agent, a hydrophilic material, a hydrophobic material and a solvent;

The crosslinking agent comprises one or more materials selected from poly (dimethylsiloxane)-diglycidyl ether, polyethylene glycol diglycidyl ether, 4-(2,3-epoxy propoxy)-N, N-(2,3-epoxy propyl) diphenylamine;

The hydrophilic material comprises one or more materials selected from polyethylene oxide, a copolymer containing polyethylene oxide, propylene oxide, a copolymer containing propylene oxide, polyvinylpyrrolidone and polyvinyl alcohol;

The hydrophobic material comprises one or more materials selected from polyvinyl pyridine, vinyl pyridine-acrylamide copolymer, polyvinyl pyrrole and vinyl pyrrole-acrylamide copolymer.

In another preferred embodiment of the present invention, the hydrophilic material is polyethylene oxide or a copolymer containing polyethylene oxide, and the hydrophobic material is polyvinyl pyridine.

In another preferred embodiment of the present invention, the crosslinking agent is poly (dimethylsiloxane)-diglycidyl ether.

In another preferred embodiment of the present invention, the raw materials of the compatible membrane further comprise a reinforcing agent, wherein the reinforcing agent comprises one or more materials selected from a styrene-vinyl pyridine copolymer, a styrene-vinyl pyrrole copolymer and a styrene-acrylamide copolymer.

In another preferred embodiment of the present invention, the reinforcing agent comprises a styrene-vinyl pyridine copolymer.

In another preferred embodiment of the present invention, the raw materials of the compatible membrane further comprise a free radical scavenger, wherein the free radical scavenger comprises one or more materials selected from ethanolamine, propanolamine, isopropanolamine, aniline, polyethylene oxide with terminal amino groups, ethylene oxide copolymer and polypropylene oxide with terminal amino groups.

In another preferred embodiment of the present invention, the free radical scavenger is ethanolamine.

The present invention also provides a preparation method for the biocompatible membrane, comprising the steps of:

A) Mixing a crosslinking agent, a hydrophilic material and a hydrophobic material in a solvent, letting them react for 40-120 minutes at a temperature of 20-70° C., and then letting them react for 40-120 minutes at a temperature of 40-70° C., thereby obtaining a biocompatible membrane solution;

The crosslinking agent comprises one or more materials selected from poly (dimethylsiloxane)-diglycidyl ether, polyethylene glycol diglycidyl ether, 4-(2,3-epoxy propoxy)-N, N-(2,3-epoxy propyl) diphenylamine;

The hydrophilic material comprises one or more materials selected from polyethylene oxide, a copolymer containing polyethylene oxide, propylene oxide, a copolymer containing propylene oxide, polyvinylpyrrolidone and polyvinyl alcohol;

The hydrophobic material comprises one or more materials selected from polyvinyl pyridine, vinyl pyridine-acrylamide copolymer, polyvinyl pyrrole and vinyl pyrrole-acrylamide copolymer;

B) Immersing a base body in the biocompatible membrane solution and coating the biocompatible membrane solution on the surface of the base body by using a dip-coating method;

C) Drying the base body coated with the biocompatible membrane solution, thereby obtaining a base body covered by the biocompatible membrane.

In another preferred embodiment of the present invention, in the aforesaid preparation method, step A further comprising: mixing a crosslinking agent, a hydrophilic material, a hydrophobic material and a reinforcing agent in a solvent, letting them react for 40-120 minutes at a temperature of 20-70° C., and then letting them react for 40-120 minutes at a temperature of 40-70° C., thereby obtaining a biocompatible membrane solution.

The present invention also provides an implantable biosensor, comprising a biosensor base body and a biocompatible membrane formed on the surface of the biosensor base body.

The biocompatible membrane is the biocompatible membrane described above.

Compared with the prior art, the present invention has the following advantages:

The present invention provides a biocompatible membrane, mainly made of the following components: a crosslinking agent, a hydrophilic material, a hydrophobic material and a solvent. The crosslinking agent comprises one or more materials selected from poly (dimethylsiloxane)-diglycidyl ether, polyethylene glycol diglycidyl ether, 4-(2,3-epoxy propoxy)-N, N-(2,3-epoxy propyl) diphenylamine. The hydrophilic material comprises one or more materials selected from polyethylene oxide, a copolymer containing polyethylene oxide, propylene oxide, a copolymer containing propylene oxide, polyvinylpyrrolidone and polyvinyl alcohol. The hydrophobic material comprises one or more materials selected from polyvinyl pyridine, vinyl pyridine-acrylamide copolymer, polyvinyl pyrrole and vinyl pyrrole-acrylamide copolymer. The present invention greatly improves the biocompatibility of glucose biosensors by means of optimizing and selecting materials with high biocompatibility as raw materials for preparing biocompatible membranes (selective permeation membranes). Through adjusting the components (hydrophobic and hydrophilic components) of the selective biocompatible membrane and the proportion of the components, the regulation and control of oxygen and glucose are simultaneously achieved. In addition, by adding free radical scavengers after the biocompatible membrane solution is prepared, the stability and service life of the biocompatible membrane solution are significantly improved and the performances do not vary significantly within one year. Thus, an implantable continuous glucose monitoring system with high consistency is achieved.

BRIEF DESCRIPTION OF THE DRAWINGS

To clearly explain the embodiments of the present invention or the technical solutions in the prior art, the drawings used in the embodiments or the prior art are briefly described hereinafter. It is obvious that the drawings in the description are merely some embodiments of the present invention. For those skilled in the art, other drawings may be obtained based on the above drawings without paying creative labor.

DETAILED DESCRIPTION

Figure 1:
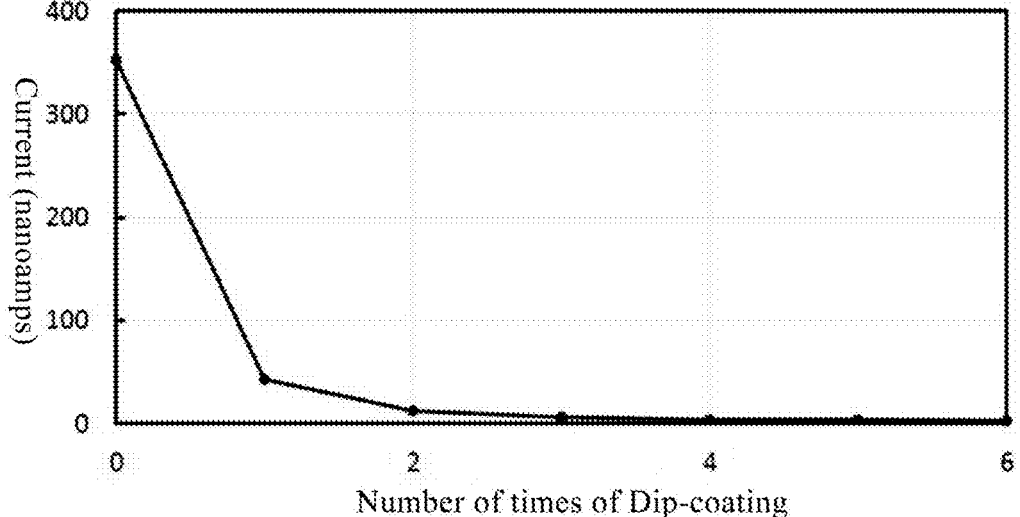
FIG. 1 is a conceptual diagram illustrating the relationship between the current of the implantable glucose biosensor in the PBS buffer solution of glucose and the number of times of performing the dip-coating process.

The present invention provides a biocompatible membrane, mainly made of the following components: a cross-linking agent, a hydrophilic material, a hydrophobic material and a solvent.

The crosslinking agent comprises one or more materials selected from poly (dimethylsiloxane)-diglycidyl ether, polyethylene glycol diglycidyl ether, 4-(2,3-epoxy propoxy)-N, N-(2,3-epoxy propyl) diphenylamine;

The hydrophilic material comprises one or more materials selected from polyethylene oxide, a copolymer containing polyethylene oxide, propylene oxide, a copolymer containing propylene oxide, polyvinylpyrrolidone and polyvinyl alcohol;

The hydrophobic material comprises one or more materials selected from polyvinyl pyridine, vinyl pyridine-acrylamide copolymer, polyvinyl pyrrole and vinyl pyrrole-acrylamide copolymer.

In the present invention, the crosslinking agent comprises one or more materials selected from poly (dimethylsiloxane)-diglycidyl ether, polyethylene glycol diglycidyl ether, 4-(2,3-epoxy propoxy)-N, N-(2,3-epoxy propyl) diphenylamine. Preferably, the crosslinking agent comprises poly (dimethylsiloxane)-diglycidyl ether. An amount of the crosslinking agent is preferably 500 to 5000 parts by weight, more preferably, 1000 to 4999 parts by weight, and most preferably, 2000 to 3000 parts by weight. Specifically, in the embodiment of the present invention, the amount of the crosslinking agent may be 1500 or 2000 parts by weight.

The hydrophilic material comprises one or more materials selected from polyethylene oxide, a copolymer containing polyethylene oxide, propylene oxide, a copolymer containing propylene oxide, polyvinylpyrrolidone and polyvinyl alcohol. Preferably, the hydrophilic material comprises propylene oxide or a copolymer containing propylene oxide. An amount of the hydrophilic material is preferably 5 to 50 parts by weight, more preferably, 10 to 40 parts by weight, and most preferably, 20 to 30 parts by weight. Specifically, in the embodiment of the present invention, the amount of the hydrophilic material may be 20 parts by weight.

The hydrophobic material comprises one or more materials selected from polyvinyl pyridine, vinyl pyridine-acrylamide copolymer, polyvinyl pyrrole and vinyl pyrrole-acrylamide copolymer. Preferably, the hydrophobic material comprises polyvinyl pyridine. An amount of the hydrophobic material is preferably 200 to 5000 parts by weight, more preferably, 500 to 40000 parts by weight, and most preferably, 1000 to 3000 parts by weight. Specifically, in the embodiment of the present invention, the amount of the hydrophobic material may be 1000 or 2000 parts by weight.

The reinforcing agent is a hydrophobic material capable of enhancing the mechanical strength of the biocompatible membrane. Preferably, the reinforcing agent comprises one or more materials selected from a styrene-vinyl pyridine copolymer, a styrene-vinyl pyrrole copolymer and a styrene-acrylamide copolymer. More preferably, the reinforcing agent comprises a styrene-vinyl pyridine copolymer. An amount of the reinforcing agent is preferably 200 to 5000 parts by weight, more preferably, 500 to 40000 parts by weight, more preferably, 1000 to 3000 parts by weight, and most preferably, 2000 to 2500 parts by weight. Specifically, in the embodiment of the present invention, the amount of the reinforcing agent may be 1000 or 2000 parts by weight.

The free radical scavenger is capable of completely consuming the free radicals (i.e., a crosslinking agent) in the solution that have not yet participated in the reaction. Preferably, the free radical scavenger comprises one or more materials selected from ethanolamine, propanolamine, iso-propanolamine, aniline, polyethylene oxide with terminal amino groups, ethylene oxide copolymer and polypropylene oxide with terminal amino groups. Preferably, the free radical scavenger comprises ethanolamine. An amount of the free radical scavenger is preferably 200 to 2000 parts by weight, more preferably, 500 to 1000 parts by weight, and most preferably, 500 to 800 parts by weight. Specifically, in the embodiment of the present invention, the amount of the free radical scavenger may be 500 or 600 parts by weight.

Preferably, the solvent is an alcohol with a volume fraction of 95%, such as one or more selected from methanol, ethanol, propanol and isopropanol. An amount of the solvent is preferably 20000 parts by weight.

The present invention also provides a preparation method for the biocompatible membrane, comprising the steps of:

A) Mixing a crosslinking agent, a hydrophilic material and a hydrophobic material in a solvent, letting them react for 40-120 minutes at a temperature of 20-70° C., and then letting them react for 40-120 minutes at a temperature of 40-70° C., thereby obtaining a biocompatible membrane solution;

The crosslinking agent comprises one or more materials selected from poly (dimethylsiloxane)-diglycidyl ether, polyethylene glycol diglycidyl ether, 4-(2,3-epoxy propoxy)-N, N-(2,3-epoxy propyl) diphenylamine;

The hydrophilic material comprises one or more materials selected from polyethylene oxide, a copolymer containing polyethylene oxide, propylene oxide, a copolymer containing propylene oxide, polyvinylpyrrolidone and polyvinyl alcohol;

The hydrophobic material comprises one or more materials selected from polyvinyl pyridine, vinyl pyridine-acrylamide copolymer, polyvinyl pyrrole and vinyl pyrrole-acrylamide copolymer;

B) Immersing a base body in the biocompatible membrane solution and coating the biocompatible membrane solution on the surface of the base body by using a dip-coating method;

C) Drying the base body coated with the biocompatible membrane solution, thereby obtaining a base body covered by the biocompatible membrane.

For the raw materials used to prepare the biocompatible membrane solution in the present invention are the same as the aforesaid, they are briefly described herein.

In the present invention, a hydrophilic material solution, a hydrophobic material solution and a reinforcing agent solution are prepared by adding an appropriate amount of solvent to a hydrophilic material, a hydrophobic material and a reinforcing agent. The solvent used is an alcohol solvent with a volume fraction of 95%. The mass concentration of the prepared hydrophilic material solution is preferably 5 to 20 mg/ml, and more preferably, 10 to 15 mg/ml. Specifically, in the embodiment of the present invention, the mass concentration of the prepared hydrophilic material solution is 10 mg/ml. The mass concentration of the hydrophobic material solution is preferably 50-300 mg/ml, and more preferably, 100-200 mg/ml. Specifically, in the embodiment of the present invention, the mass concentration of the hydrophobic material solution is 100 mg/ml. The mass concentration of the reinforcing agent solution is preferably 25 to 300 mg/ml, more preferably, 50 to 200 mg/ml, and most preferably, 100 to 150 mg/ml. Specifically, in the embodiment of the present invention, the mass concentration of the reinforcing agent solution is 100 mg/ml.

In the present invention, the crosslinking agent, the hydrophilic material solution, the hydrophobic material solution and the reinforcing agent are mixed and heated for a certain duration, and then the free radical scavenger is added. After the reaction continues for a certain duration, the biocompatible membrane solution is obtained.

In the present invention, the reaction temperature before adding the free radical scavenger is preferably 20 to 70° C., more preferably, 30 to 60° C., and most preferably, 40 to 50° C. Specifically, in the embodiment of the present invention, the reaction temperature is 30° C. or 60° C. The reaction duration before adding the free radical scavenger is preferably 40 to 120 minutes, more preferably, 50 to 100 minutes, and most preferably, 60 to 80 minutes. Specifically, in the embodiment of the present invention, the reaction duration is 60 minutes.

The reaction temperature after adding the free radical scavenger is preferably 20 to 70° C., more preferably, 30 to 60° C., and most preferably, 40 to 50° C. Specifically, in the embodiment of the present invention, the reaction temperature is 30° C. or 60° C. The reaction duration after adding the free radical scavenger is preferably 40 to 120 minutes, more preferably, 50 to 100 minutes, and most preferably, 60 to 80 minutes. Specifically, in the embodiment of the present invention, the reaction duration is 60 minutes.

The addition of ethanolamine is used to stabilize the viscosity of the solution, ensure the consistency of the finished products, and completely consume the free radicals (a crosslinking agent) in the solution that have not yet participated in the reaction. After undergoing the aforesaid treatment, the stability of the biocompatible membrane solution is significantly improved and the service life is greatly prolonged. These performances do not vary within one year.

After the reaction, the viscosity of the obtained biocompatible membrane solution at a temperature of 25° C. is preferably kept at a pressure of 50 to 1000 mPa, more preferably, 100 to 900 mPa·s, more preferably, 200 to 800 mPa·s, and most preferably, 300 to 700 mPa·s. Specifically, the pressure may be 100 mPa·s, 200 mPa·s, 300 mPa·s, 400 mPa·s, 500 mPa·s, 600 mPa·s, 700 MPa·s or 800 MPa·s.

In the present invention, after the biocompatible membrane solution is obtained, the base body is immersed in the biocompatible membrane solution. Thus, a biocompatible membrane is formed on the surface of the base body by using the dip-coating method.

In the present invention, the base body is preferably a biosensor, including but not limited to a glucose biosensor, a lactic acid biosensor and a blood ketone biosensor.

Preferably, the dip-coating process is performed in an environment at a clean grade of 100000 and saturated with ethanol vapor. The lowering speed of the dip-coating process is preferably 100 to 5000 μm/s, more preferably, 500 to 4000 μm/s, more preferably, 1000-3000 μm/s, and most preferably, 1500-2000 μm/s. Specifically, in the embodiment of the present invention, the lowering speed of the dip-coating process is 200 μm/s, 2000 μm/s or 5000 μm/s. The lifting speed of the dip-coating process is preferably 20 to 300 μm/s, more preferably, 50 to 250 μm/s, and most preferably, 100 to 200 μm/s. Specifically, in the embodiment of the present invention, the lifting speed of the dip-coating process is 25 μm/s, 100 μm/s or 300 μm/s.

Subsequently, the base body covered by the biocompatible membrane is dried in a strictly controlled temperature. After the solvent is completely evaporated, the surface of the glucose biosensor is completely covered by a thin biocompatible membrane.

In the present invention, the drying temperature is preferably 22 to 25° C., and more preferably, 23 to 24° C. In the present invention, the drying duration is not limited as long as the solvent is completely evaporated. The drying duration is preferably 30 to 120 minutes, more preferably, 50 to 100 minutes, and most preferably, 60 to 80 minutes. Preferably, the relative humidity of the membrane forming environment is 35 to 45%.

To increase the thickness of the biocompatible membrane, the aforesaid processes may be repeated for many times. Normally, after performing the processes for 3-4 times, the required thickness is obtained. Because the biocompatible membrane of the present invention is formed after performing multiple membrane forming processes, the regulation and control of oxygen and glucose become convenient and effective by means of optimizing the thickness of the membrane (the number of times of dip-coating) and the formula of the biocompatible membrane solution. Therefore, anticipated effect of the biocompatible membrane is achieved.

The present invention also provides an implantable biosensor, comprising a biosensor base body and a biocompatible membrane formed on the surface of the biosensor base body.

The biocompatible membrane is the biocompatible membrane described above.

The thickness of the biocompatible membrane is preferably 50 to 500 μm, more preferably, 100 to 400 μm, and most preferably, 200 to 300 μm.

The biosensor is preferably a glucose biosensor comprising electrochemically activated glucose magnesium oxide.

Preferably, in the present invention, the glucose biosensor is developed based on the electrochemical oxidoreductase activation technology, namely, the third-generation biosensing technology. The third-generation biosensing technology is a biosensing technology developed by direct electrochemical activation of oxidoreductase. Tests show that the glucose biosensor containing the electrochemically activated glucose oxidase of the present invention based on the third-generation biosensing technology maintains its catalytic oxidation performance for glucose. Meanwhile, by means of the direct electrochemical activation, compared with the catalytic oxidation efficiency of natural glucose oxidase using oxygen, the catalytic oxidation efficiency for glucose of the present invention is significantly improved. Moreover, compared with the second-generation biosensing technology, the direct electrochemical activation of glucose oxidase greatly simplifies the design and production of glucose biosensors while significantly improving the sensitivity, accuracy, stability, specificity and anti-interference ability of glucose biosensors.

In addition, similar for the second-generation biosensing technology, as a natural mediator of glucose oxidase, oxygen inevitably participates in the catalytic oxidation of glucose and becomes a major interference factor during the glucose monitoring. Although the catalytic oxidation efficiency of glucose using a direct electrochemical activation is much higher than that of glucose oxidase using a natural mediator (oxygen), the influence of oxygen cannot be removed thoroughly. Furthermore, due to the high sensitivity of direct electrochemical activation for glucose detection, to effectively regulate and control glucose becomes another difficulty faced by the third-generation biosensing technology. This is also why the service life of most implantable continuous glucose monitoring systems is unsatisfactory although the implantable continuous glucose monitoring system has been developed for more than 30 years.

Further, in the present invention, the surface of the glucose biosensor containing the electrochemically activated glucose oxidase is covered by a highly biocompatible membrane, which perfectly realizes the high biocompatibility of the glucose biosensor while achieving the accurate regulation of oxygen and glucose.

In addition, the implantable biosensor covered by the biocompatible membrane of the present invention may also be applied to other implantable continuous monitoring systems, such as systems for monitoring lactic acid and blood ketone.

The preparation method of the implantable biosensor of the present invention is the same as that of the biocompatible membrane described above, apart from that the base body in the method of the present invention is replaced by a glucose biosensor containing electrochemically activated glucose oxidase. For other aspects are the same, they are briefly described herein.

The present invention provides a biocompatible membrane, which is composed of the following components: 500-5000 parts by weight of a crosslinking agent, 5-50 parts by weight of a hydrophilic material, 200-5000 parts by weight of a hydrophobic material, 200-5000 parts by weight of a reinforcing agent, 200-2000 parts by weight of a free radical scavenger and 20000 parts by weight of a solvent. The hydrophilic material comprises one or more materials selected from polyethylene oxide, a copolymer containing polyethylene oxide, propylene oxide, a copolymer containing propylene oxide, polyvinylpyrrolidone and polyvinyl alcohol. The hydrophobic material comprises one or more materials selected from polyvinyl pyridine, vinyl pyridine-acrylamide copolymer, polyvinyl pyrrole and vinyl pyrrole-acrylamide copolymer. The reinforcing agent comprises one or more materials selected from a styrene-vinyl pyridine copolymer, a styrene-vinyl pyrrole copolymer and a styrene-acrylamide copolymer. The free radical scavenger comprises one or more materials selected from ethanolamine, propanolamine, isopropanolamine, aniline, polyethylene oxide with terminal amino groups, ethylene oxide copolymer and polypropylene oxide with terminal amino groups. The present invention greatly improves the biocompatibility of glucose biosensors by means of optimizing and selecting materials with high biocompatibility as raw materials for preparing biocompatible membranes (selective permeation membranes).

Through adjusting the components (hydrophobic and hydrophilic components) of the selective biocompatible membrane and the proportion of the components, the regulation and control of oxygen and glucose are simultaneously achieved. In addition, by adding free radical scavengers after the biocompatible membrane solution is prepared, the stability and service life of the biocompatible membrane solution are significantly improved. Thus, an implantable continuous glucose monitoring system with high consistency is achieved.

The glucose biosensor covered by the highly biocompatible membrane of the present invention is capable of accurately simultaneously regulating oxygen and glucose. More importantly, the presence of the biocompatible membrane of the present invention significantly widens the monitoring range of glucose while greatly improving the stability and biocompatibility of glucose biosensors in human bodies. Through adopting the aforesaid solution, the calibration-free (factory-calibrated) implantable continuous glucose monitoring system fully meets the demands such that the mass production is realized. Additionally, the implantable biosensor covered by the biocompatible membrane of the present invention may also be applied to other implantable continuous monitoring systems, such as systems for monitoring lactic acid and blood ketone.

To further elaborate the technical solution of the present invention, a biocompatible membrane, a preparation method for the biocompatible membrane and an implantable biosensor of the present invention are described below in combination with detailed embodiments. However, these embodiments should not be understood as limitations to the present invention.

Embodiment 1

The solvents in this embodiment are all 95% ethanol.

In this embodiment, 2 ml of poly (dimethyl siloxane)-diglycidyl ether, 2 ml of 10 mg/ml polyethylene oxide, 20 ml of 100 mg/ml polyethylene pyridine and 20 ml of 100 mg/ml styrene-vinyl pyridine copolymer are sufficiently mixed and then heated in a water bath at a temperature of 60° C. for 60 minutes. Subsequently, 0.5 ml of ethanolamine is added into the biocompatible membrane solution after their reaction. After being sufficiently mixed, the biocompatible membrane solution is heated in a water bath at a temperature of 60° C. for 60 minutes, thereby obtaining the prepared biocompatible membrane solution.

In an environment at a clean grade of 100000 and saturated with ethanol vapor, the biocompatible membrane solution is uniformly coated on a glucose biosensor containing electrochemically activated glucose oxidase by using the dip-coating method. The lowering speed of the dip-coating process is 2000 μm/s, and the lifting speed of the dip-coating process is 100 μm/s. Subsequently, it is dried for 60 minutes in an environment with a temperature of 25° C. and 40% relative humidity. The dip-coating and drying processes are repeated for 5 times. After six cycles of dip coating and drying processes, an implantable glucose biosensor is obtained.

The glucose biosensor in this embodiment is immersed in a PBS buffer solution with 5 mmol/L glucose for detection. The test result is shown in FIG. 1. FIG. 1 is a conceptual diagram illustrating the relationship between the current of the implantable glucose biosensor in the PBS buffer solution of glucose and the number of times of performing the dip-coating process.

As shown in FIG. 1, when the glucose biosensor is completely covered by the biocompatible membrane, along with the increase of the thickness of the membrane (the number of times of performing the dip-coating process), the current in catalytic oxidation of glucose using a direct electrochemical activation decreases dramatically. After six cycles of dip-coating and drying processes, the current of the glucose biosensor is reduced to less than 1% of the original value. This result shows that the biocompatible membrane of the present invention is capable of effectively regulating and controlling glucose (reflected in the current in the glucose catalytic oxidation).

Figure 2:
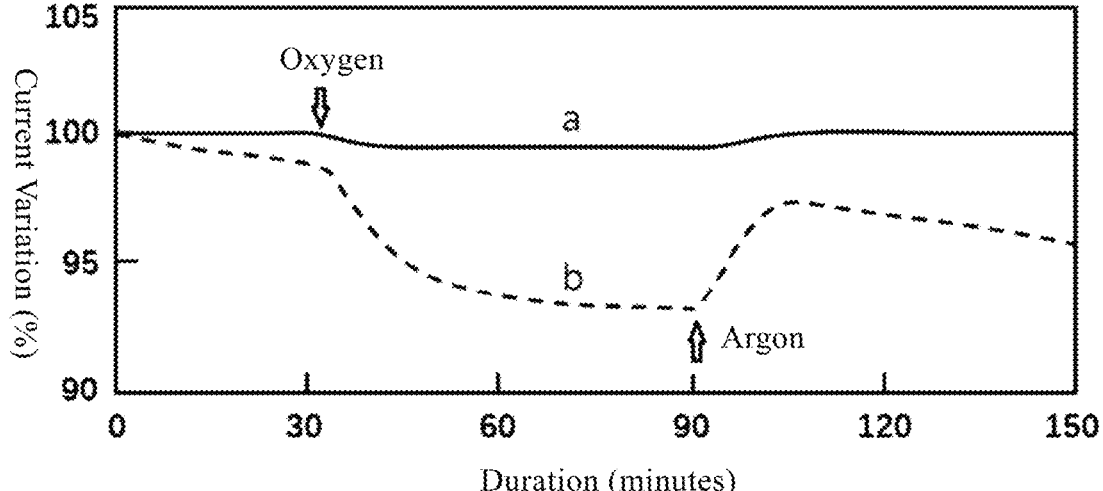
FIG. 2 is a conceptual diagram illustrating the influence of oxygen on the current signal of the implantable glucose biosensor in embodiment 1 of the present invention, wherein curve a represents a glucose biosensor covered with a biocompatible membrane in embodiment 1, and curve b represents a glucose biosensor without a biocompatible membrane.

As mentioned previously, for glucose biosensors developed based on the third-generation biosensing technology, when performing a direct electrochemical detection of glucose, as a natural mediator of glucose oxidase, oxygen inevitably participates in the catalytic oxidation of glucose and becomes a major interference factor during the glucose monitoring. If the glucose biosensor fails to effectively regulate and control oxygen, the interference of oxygen becomes a threat to the accurate monitoring of glucose. The test proves that the biocompatible membrane is capable of basically eliminating the interference of oxygen. FIG. 2 is a conceptual diagram illustrating the influence of oxygen on the current signal of the implantable glucose biosensor in embodiment 1 of the present invention.

When oxygen is introduced into the PBS buffer solution containing 10 mmol/L glucose, a glucose biosensor covered with the biocompatible membrane in embodiment 1 has an attenuation less than 1% of the original value. When the oxygen in the solution is completely removed by using argon, the current signal recovers to an original level (FIG. 2, curve a). On the contrary, when oxygen is introduced, the current signal of the glucose biosensor without the biocompatible membrane rapidly attenuates. Due to the poor stability of the glucose biosensor without the biocompatible membrane, the current signal cannot recover to the original level after the oxygen in the solution is completely removed by using argon (FIG. 2, curve b).

Figure 3:
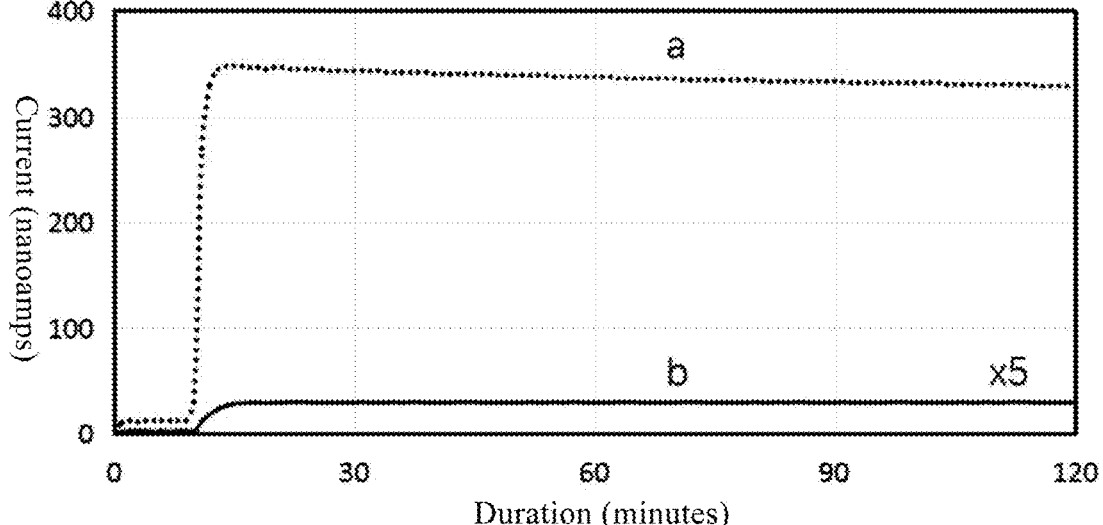
FIG. 3 is a conceptual diagram illustrating a current response curve of the implantable glucose biosensor in PBS buffer solution containing 5 mmol/L glucose in embodiment 1 of the present invention, wherein curve a represents the glucose biosensor without a biocompatible membrane, and curve b represents the glucose biosensor covered with a biocompatible membrane in embodiment 1.
Figure 4:
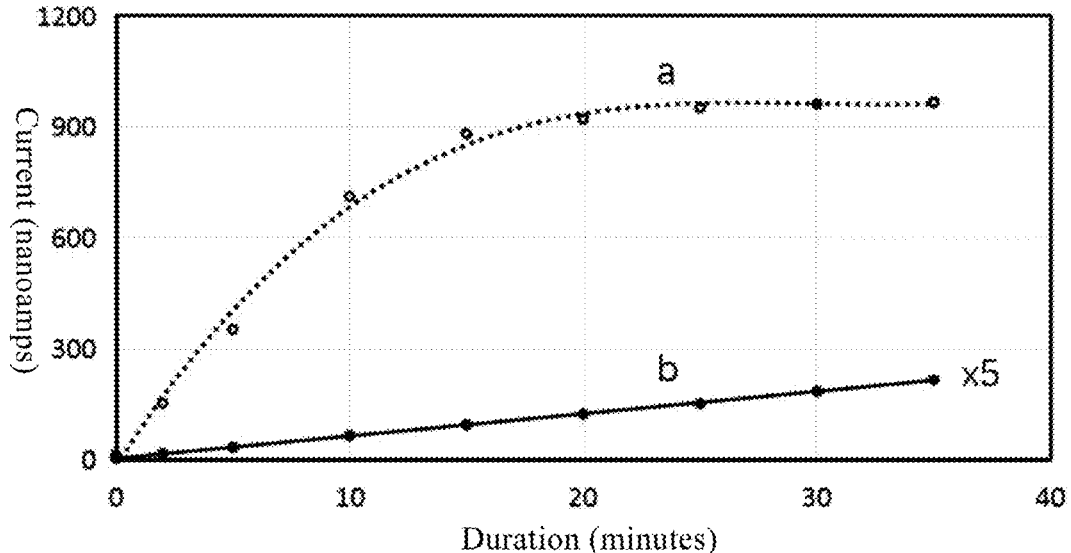
FIG. 4 is a conceptual diagram illustrating a working curve of an implantable glucose biosensor in embodiment 1 of the present invention, wherein curve a represents a glucose biosensor without a biocompatible membrane, and curve b represents a glucose biosensor covered with a biocompatible membrane in embodiment 1.

In the present invention, although an accurate regulation and control of oxygen and glucose is realized by covering the glucose biosensor with the biocompatible membrane, to prepare glucose biosensors with high accuracy, high reproducibility and high stability, and capable of being used in an implantable glucose continuous monitoring system, a sufficiently wide linear response range of these sensors must be ensured. These performances can be achieved by optimizing the biocompatible membranes provided on glucose biosensors. For example, when a glucose biosensor undergoes three cycles of dip-coating and drying processes in the biocompatible membrane solution, compared with a glucose biosensor without any biocompatible membrane, although its response duration to glucose extends from 2 minutes to 4 minutes, its current signal is well regulated and controlled by this biocompatible membrane. Moreover, the stability of the glucose biosensor is significantly improved (FIG. 3). Meanwhile, the monitoring range of glucose is expanded from 10 mmol/L to 35 mmol/L, fully meeting the needs of diabetic patients for monitoring glucose (FIG. 4).

Although the above test results prove that the biocompatible membrane of the present invention exhibits superior performance in vitro, its performance in-vivo monitoring is the most powerful proof of its biocompatibility. Therefore, in the present invention, a glucose biosensor covered with a biocompatible membrane is applied to an implantable continuous glucose monitoring system on the basis of in-vitro work.

Figure 5:
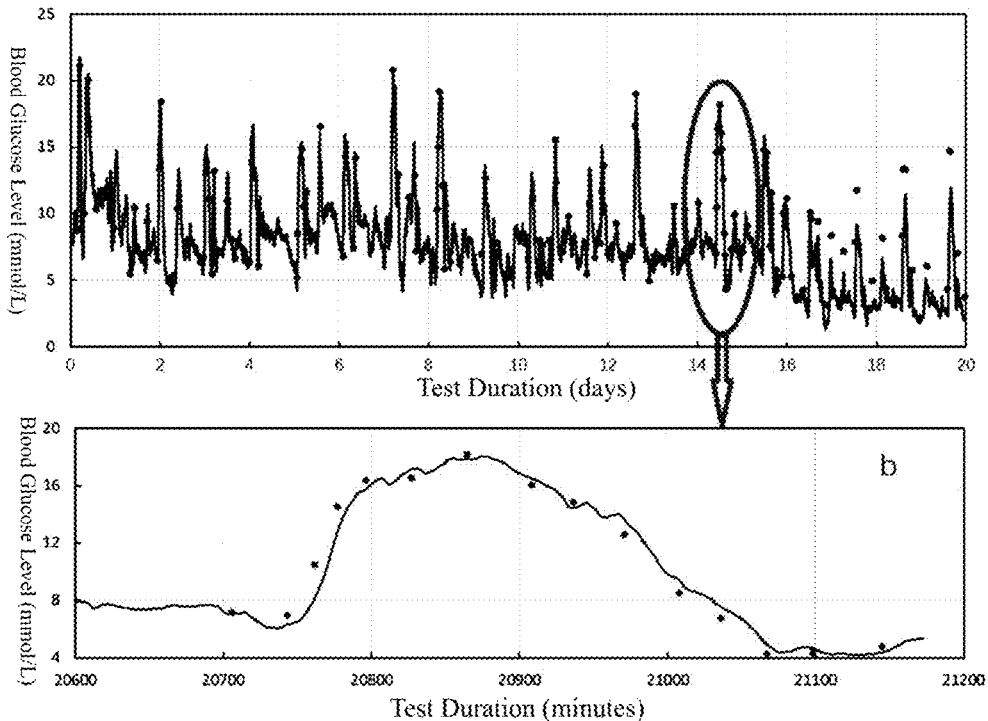
FIG. 5 is a conceptual diagram illustrating a test result of an implantable glucose biosensor in an implantable continuous glucose monitoring system in a human body in embodiment 1 of the present invention.

When testing in human bodies for 20 consecutive days, the test results of the first 16 days are ideal, and the sensitivity (baseline) does not significantly decrease (FIG. 5a). The glucose biosensor has the longest service life for human body monitoring so far. More importantly, the monitored glucose concentration (indicated by the curve) is highly consistent with the results of blood glucose detection (indicated by the dots) (FIG. 5a). From the 17th day after implantation, the sensitivity of the sensor decreases significantly, and the glucose concentration monitored by the sensor begins to differ greatly from the results of blood glucose detection. Therefore, to ensure the safety, the service life of the biocompatible membrane of the present invention is set to be 15 days.

As everyone knows, the glucose biosensor of the implantable continuous glucose monitoring system is implanted under the skin, the glucose monitored by it is the glucose in the tissue fluid, and there is an inevitable lag between the glucose in the tissue fluid and the blood glucose in the finger blood. Therefore, in the present invention, on the morning of the 15th day after the sensor is implanted, high-frequency finger blood glucose detection is performed from the fasting blood glucose. The results show that although the glucose concentration curves obtained by the two methods are highly consistent, there is an average 9-minute lag between the glucose concentration variation curve in the tissue fluid detected by the implantable continuous glucose monitoring system of the present invention and the blood glucose concentration variation curve detected by using the finger blood (FIG. 5b).

Embodiment 2

The solvents in this embodiment are all 95% normal propyl alcohol.

In this embodiment, 5 ml of poly (dimethyl siloxane)-diglycidyl ether, 5 ml of 10 mg/ml polyethylene oxide, 550 ml of 200 mg/ml polyethylene pyridine and 50 ml of 200 mg/ml styrene-vinyl pyridine copolymer are sufficiently mixed and then heated in a water bath at a temperature of 40° C. for 120 minutes. Subsequently, 2 ml of ethanolamine is added into the biocompatible membrane solution after their reaction. After being sufficiently mixed, the biocompatible membrane solution is heated in a water bath at a temperature of 40° C. for 120 minutes, thereby obtaining the prepared biocompatible membrane solution.

In an environment at a clean grade of 100000 and saturated with ethanol vapor, the biocompatible membrane solution is uniformly coated on a glucose biosensor containing electrochemically activated glucose oxidase by using the dip-coating method. The lowering speed of the dip-coating process is 200 μm/s, and the lifting speed of the dip-coating process is 25 μm/s. Subsequently, it is dried for 60 minutes in an environment with a temperature of 25° C. and 40% relative humidity. The dip-coating and drying processes are repeated for 2 times. After three cycles of dip coating and drying processes, an implantable glucose biosensor is obtained.

Figure 6:
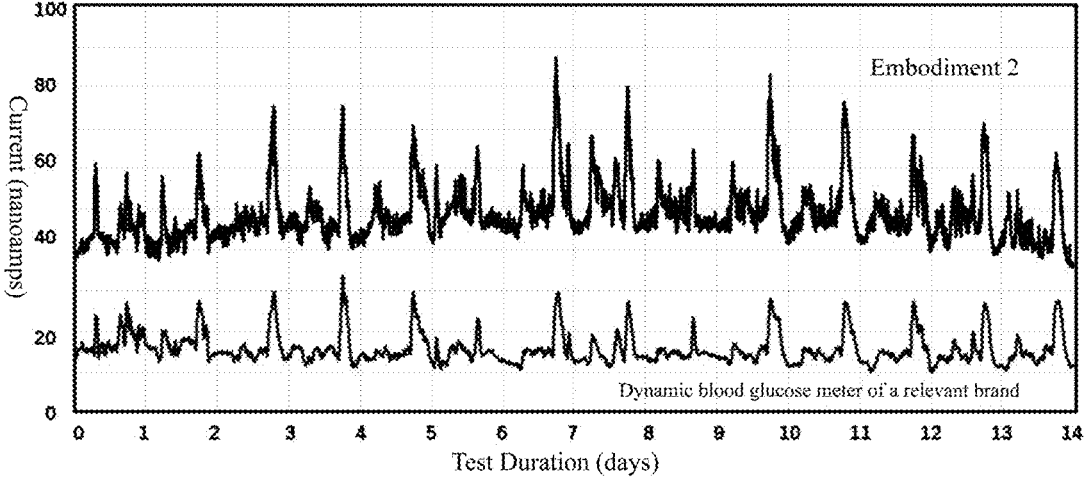
FIG. 6 is a conceptual diagram illustrating a two-week test result of an implantable glucose biosensor and a foreign-branded dynamic blood glucose meter in an implantable continuous glucose monitoring system in embodiment 2 of the present invention.

In the present invention, through covering a glucose biosensor with the compatible membrane, a glucose biosensor that can be used in an implantable glucose continuous monitoring system is achieved. After testing in human bodies for 14 consecutive days, the monitored variation curve of glucose concentration is highly consistent with that monitored by using a famous foreign-branded sensor (FIG. 6).

Embodiment 3

The solvents in this embodiment are all 95% isopropanol.

In this embodiment, 0.5 ml of poly (dimethyl siloxane)-diglycidyl ether, 0.5 ml of 10 mg/ml polyethylene oxide, 5 ml of 100 mg/ml polyethylene pyridine and 5 ml of 100 mg/ml styrene-vinyl pyridine copolymer are sufficiently mixed and then heated in a water bath at a temperature of 70° C. for 40 minutes. Subsequently, 0.2 ml of ethanolamine is added into the biocompatible membrane solution after their reaction. After being sufficiently mixed, the biocompatible membrane solution is heated in a water bath at a temperature of 70° C. for 40 minutes, thereby obtaining the prepared biocompatible membrane solution.

In an environment at a clean grade of 100000 and saturated with ethanol vapor, the biocompatible membrane solution is uniformly coated on a glucose biosensor containing electrochemically activated glucose oxidase by using the dip-coating method. The lowering speed of the dip-coating process is 5000 μm/s, and the lifting speed of the dip-coating process is 300 μm/s. Subsequently, it is dried for 40 minutes in an environment with a temperature of 22° C. and 35% relative humidity. The dip-coating and drying processes are repeated for 3 times. After four cycles of dip coating and drying processes, an implantable lactic acid biosensor is obtained. After being covered with the biocompatible membrane, the linear range of response to lactic acid of the implantable lactic acid biosensor the is widened from 8 mmol/L to 30 mmol/L, which fully meets the needs of in-vivo monitoring of lactic acid.

The above are merely preferred embodiments of the present invention. For those skilled in the art, improvements and modifications may be made without departing from the principles of the present invention. Therefore, those improvements and modifications shall fall into the scope defined by the claims of the present invention.

The invention claimed is:

1. A biocompatible membrane, comprising:
a crosslinking agent,
a hydrophilic material,
a hydrophobic material, and
a solvent, wherein the crosslinking agent comprises one or more materials selected from poly (dimethylsiloxane)-diglycidyl ether, polyethylene glycol diglycidyl ether, and 4-(2,3-epoxy propoxy)-N, N-(2,3-epoxy propyl) diphenylamine, wherein the hydrophilic material comprises one or more materials selected from polyethylene oxide, copolymer containing polyethylene oxide, propylene oxide, copolymer containing propylene oxide, polyvinylpyrrolidone, and polyvinyl alcohol, wherein the hydrophobic material comprises one or more materials selected from polyvinyl pyridine, vinyl pyridine-acrylamide copolymer, polyvinyl pyrrole, and vinyl pyrrole-acrylamide copolymer;
wherein raw materials of the biocompatible membrane further comprise a free radical scavenger, wherein the free radical scavenger comprises one or more materials selected from ethanolamine, propanolamine, isopropanolamine, aniline, polyethylene oxide with terminal amino groups, ethylene oxide copolymer, and polypropylene oxide with terminal amino groups.

2. The biocompatible membrane of claim 1, wherein the raw materials of the biocompatible membrane further comprise a reinforcing agent, wherein the reinforcing agent comprises one or more materials selected from a styrene-vinyl pyridine copolymer, a styrene-vinyl pyrrole copolymer, and a styrene-acrylamide copolymer.

3. The biocompatible membrane of claim 2, wherein the reinforcing agent comprises a styrene-vinyl pyridine copolymer.

4. The biocompatible membrane of claim 1, wherein the free radical scavenger is ethanolamine.

5. A preparation method for a biocompatible membrane, comprising the steps of:
Step A: mixing a crosslinking agent, a hydrophilic material and a hydrophobic material in a solvent, letting them react for 40-120 minutes at a temperature of 20-70° C., and then letting them react for 40-120 minutes at a temperature of 40-70° C., thereby obtaining a biocompatible membrane solution, wherein the crosslinking agent comprises one or more materials selected from poly (dimethylsiloxane)-diglycidyl ether, polyethylene glycol diglycidyl ether, and 4-(2,3-epoxy propoxy)-N, N-(2,3-epoxy propyl) diphenylamine, wherein the hydrophilic material comprises one or more materials selected from polyethylene oxide, a copolymer containing polyethylene oxide, propylene oxide, a copolymer containing propylene oxide, polyvinylpyrrolidone, and polyvinyl alcohol, wherein the hydrophobic material comprises one or more materials selected from polyvinyl pyridine, vinyl pyridine-acrylamide copolymer, polyvinyl pyrrole, and vinyl pyrrole-acrylamide copolymer;
Step B: immersing a base body in the biocompatible membrane solution and coating the biocompatible membrane solution on a surface of the base body by using a dip-coating method;
Step C: drying the base body coated with the biocompatible membrane solution, thereby obtaining a base body covered by the biocompatible membrane.

6. The preparation method of claim 5, wherein step A further comprises: mixing a crosslinking agent, a hydrophilic material, a hydrophobic material and a reinforcing agent in a solvent, letting them react for 40-120 minutes at a temperature of 20-70° C., and then letting them react for 40-120 minutes at a temperature of 40-70° C., thereby obtaining a biocompatible membrane solution.

7. An implantable biosensor, comprising:
a biosensor base body and a biocompatible membrane formed on a surface of the biosensor base body, wherein the biocompatible membrane is the biocompatible membrane as in one of claims 1, 2, 3, 4 or the biocompatible membrane obtained through the preparation method as in one of claims 5-6.

* * * * *